J. C. POTTER.
MILLING MACHINE.
APPLICATION FILED MAR. 11, 1919.
1,320,272.
Patented Oct. 28, 1919.
4 SHEETS—SHEET 1.
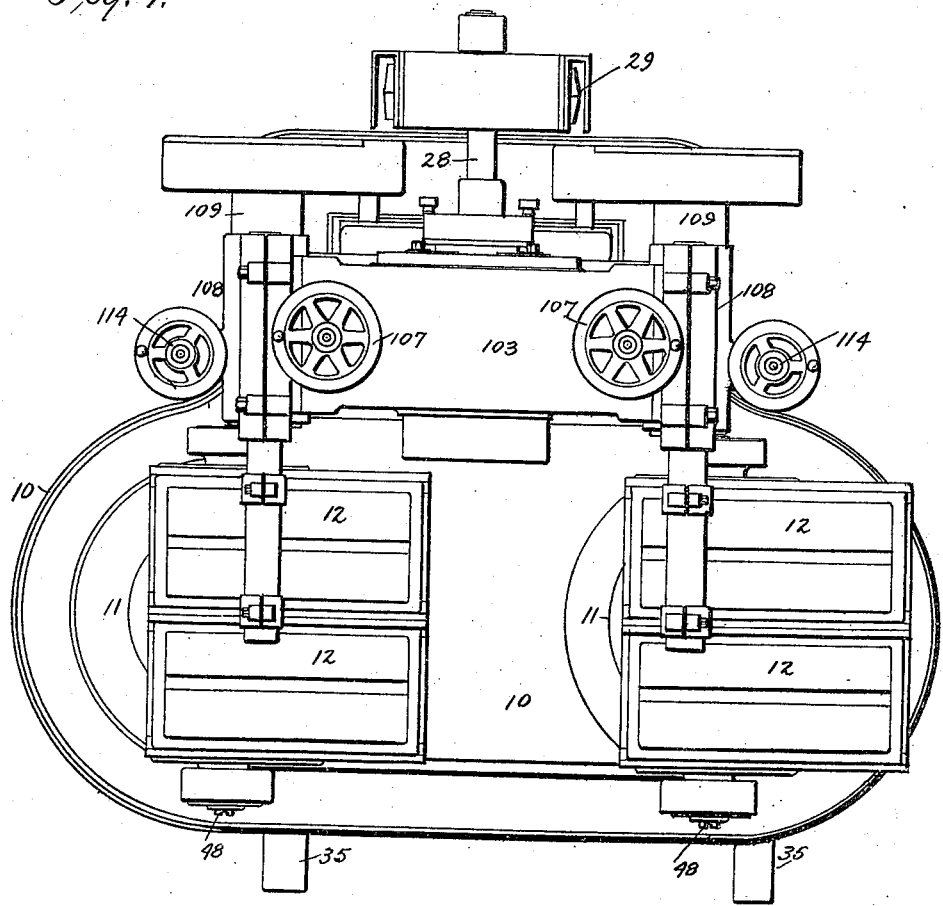
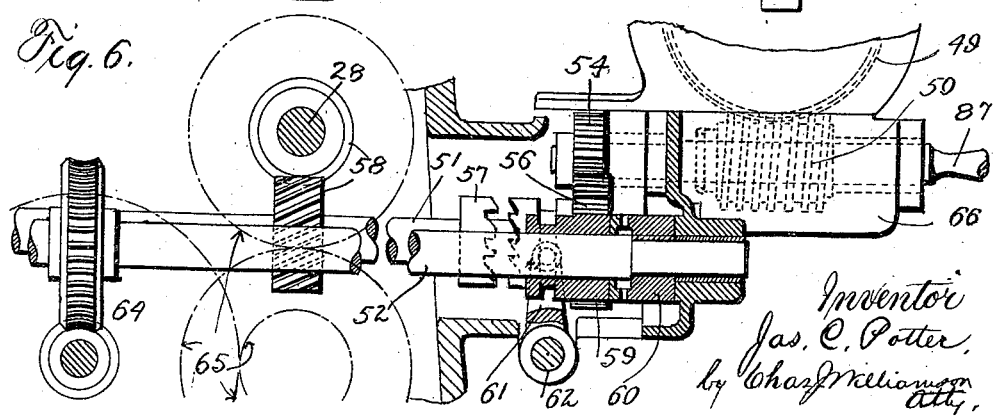

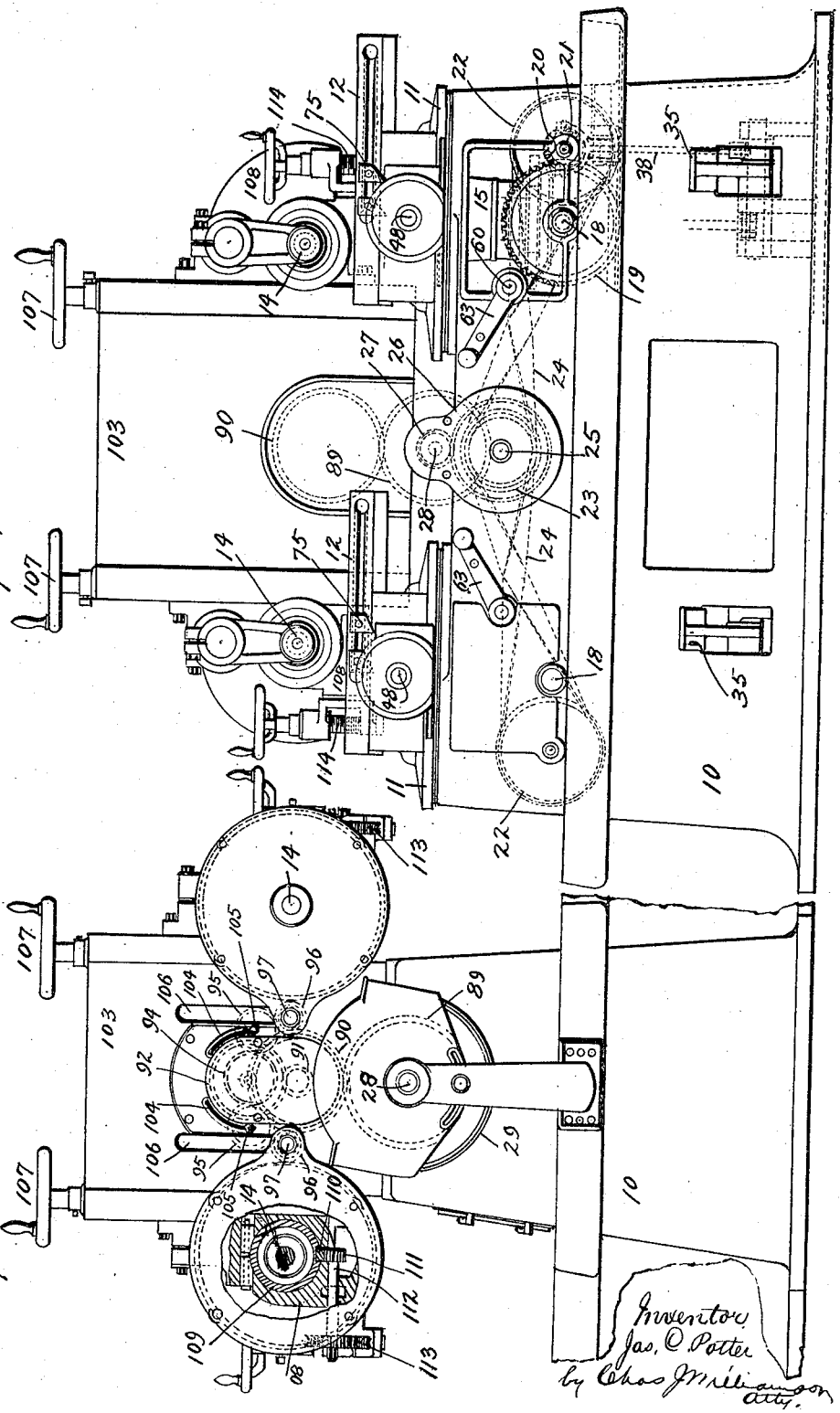

J. C. POTTER.
MILLING MACHINE.
APPLICATION FILED MAR. 11, 1919.
1,320,272.
Patented Oct. 28, 1919.
4 SHEETS—SHEET 3.
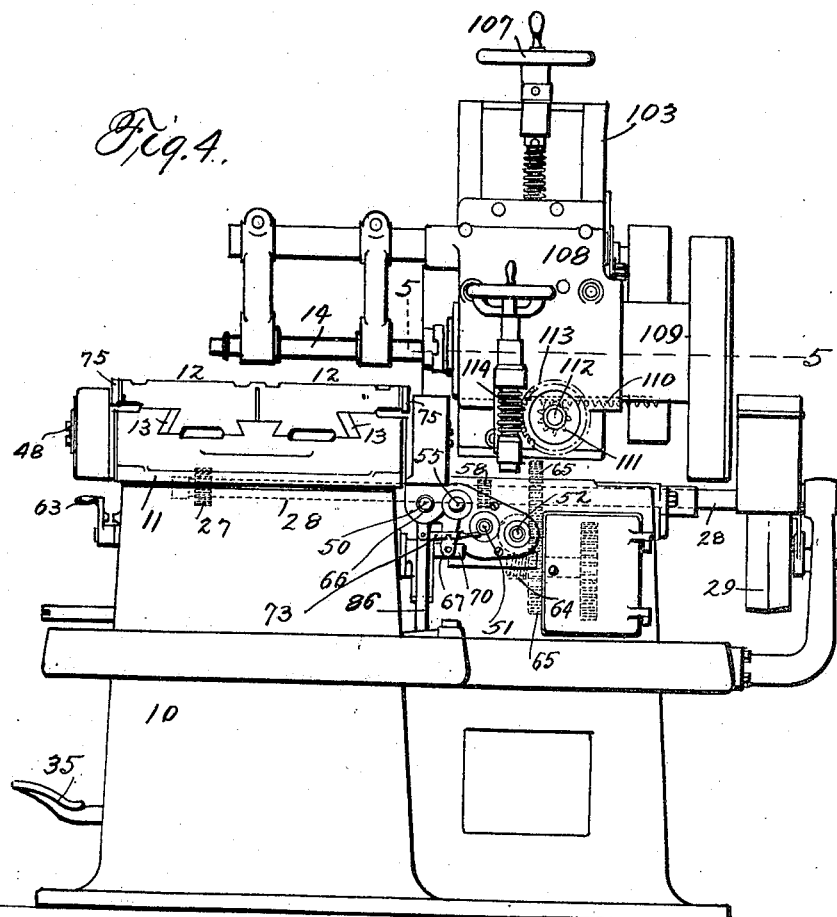
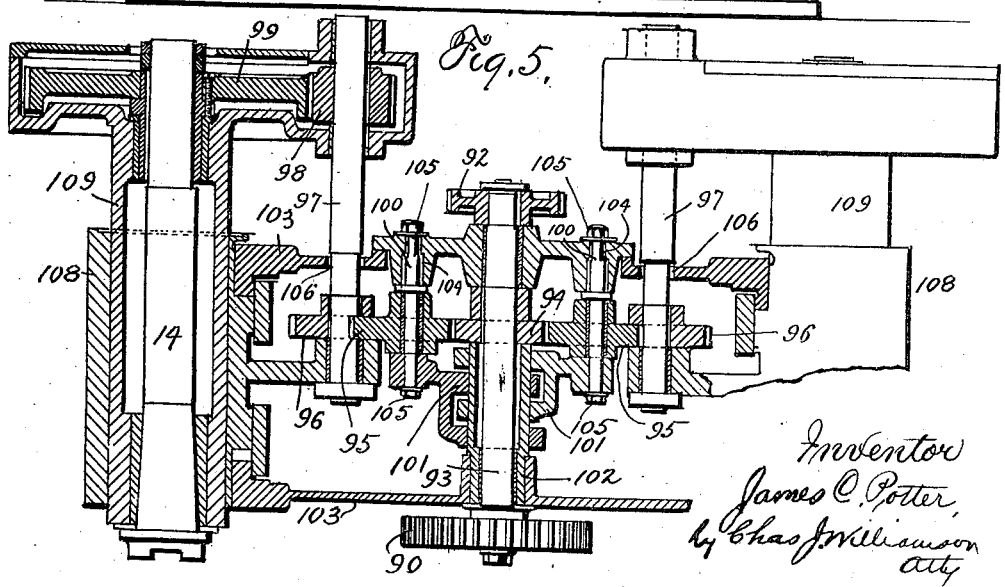
Inventor
James C. Potter,
by Chas. J. Williamson
Atty

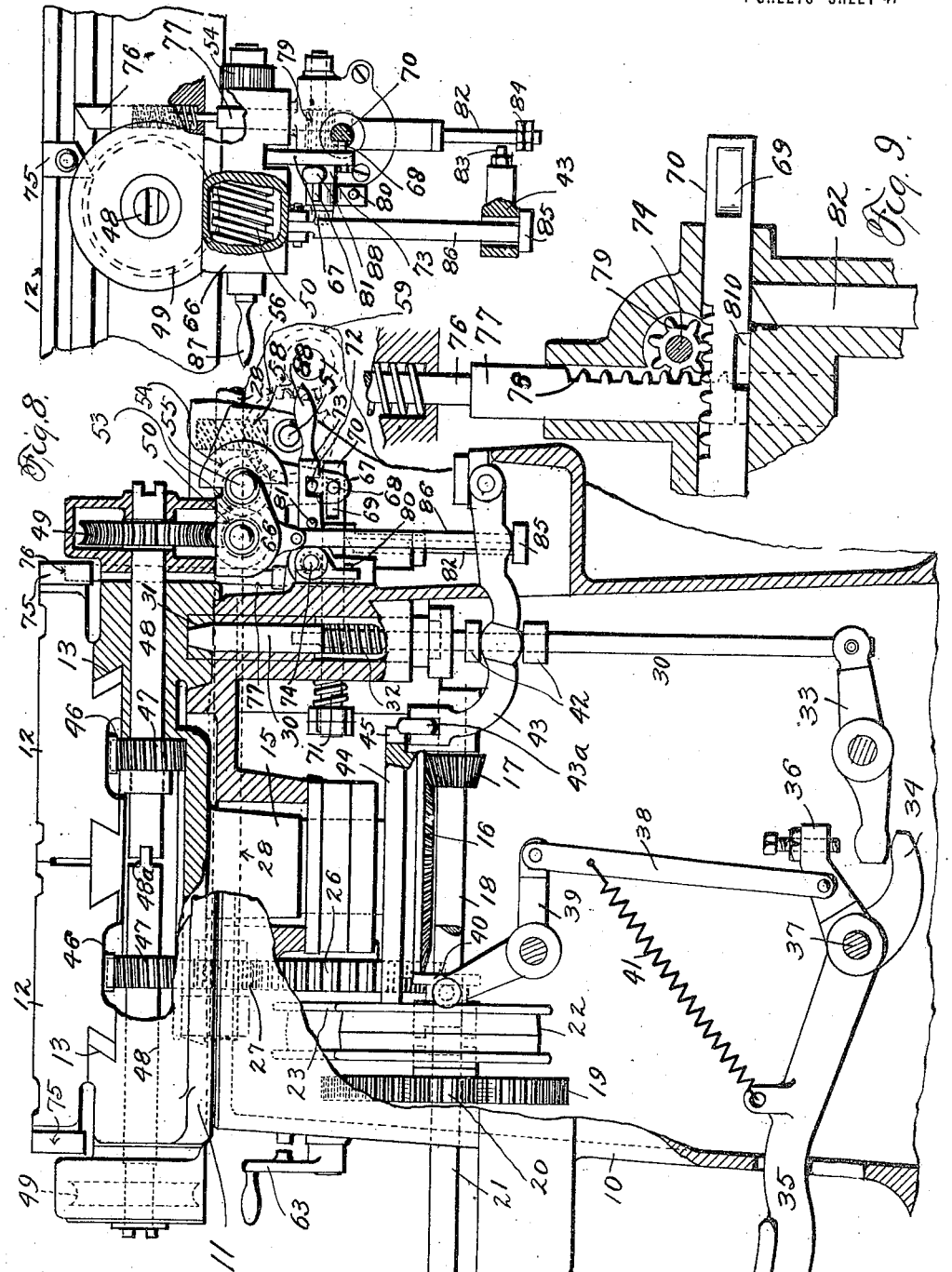

UNITED STATES PATENT OFFICE.

JAMES C. POTTER, OF PAWTUCKET, RHODE ISLAND.

MILLING-MACHINE.

1,320,272.  Specification of Letters Patent.  Patented Oct. 28, 1919.

Application filed March 11, 1919. Serial No. 281,978.

*To all whom it may concern:*

Be it known that I, JAMES C. POTTER, of Pawtucket, Rhode Island, have invented a certain new and useful Improvement in Milling-Machines, and do hereby declare that the following is a full, clear, and exact description thereof.

My invention relates to milling machines such as the kind of my United States Patents Nos. 1,060,705, May 6, 1913 and 1,186,681, June 13, 1916, and my object generally stated is to provide a milling machine which will have a capacity for large output, save the time and labor of the workman, and considering its capacity for work will be compact so as to conserve shop space, and to this end my invention consists in the milling machine having the construction substantially as hereinafter specified and claimed.

In the annexed drawings,

Figure 1 is a top plan view of a milling machine embodying my invention;

Fig. 2 is a front elevation;

Fig. 3 is a rear elevation;

Fig. 4 is a side elevation thereof;

Fig. 5 is a detail section on the line 5—5 of Fig. 4;

Fig. 6 is a section showing the feed gearing;

Fig. 7 is a view partly in side elevation and partly in section, of the front portion of the machine;

Figs. 8, and 9 are, respectively, detail views of the feed stopping devices.

Briefly described, my invention comprehends the combination, in one, unitary organization of a plurality of milling machine units, each consisting of a tool spindle and a group of work tables or holders adapted for successive coöperation with the same spindle so that while one table with its work is in position for the action of the tool, finished work can be removed from another table and new work placed thereon, the units being so relatively placed and constructed as to enable the workman, without change of position to attend to all of them, and so that the work tables of one unit will not interfere in their movements with those of another, and thus avoid waste of space which accommodation to avoid such interference, would involve. An important characteristic of the machine is that work is being performed simultaneously on the several units.

The plural work tables or holders of each unit in what I now regard as the best embodiment of my invention, are two in number and are mounted on a rotating table or turret which is revolved or indexed through a half revolution to bring the holders in succession into working and non-working relation, respectively, to the milling tool, and there is a feed mechanism associated with each work holder which, according to the working or non-working position of the holder is in or out of gear with a common feed shaft.

Referring now in detail to the drawings, 10 designates a base or housing which in plan view has a T-shape, and having at its front two oppositely situated similar pedestals upon the top of each of which is mounted the work holder or table carrying turret 11. Upon the turret are two like work holders 12, placed side by side in parallel guides 13 on the turret, eccentric of the latter and reciprocable beneath the milling cutter spindle 14, one of them at such time being beneath the cutter for action of it upon the work, and the other being beyond the cutter, at the front of the machine for ready access of the workman thereto to remove finished work or apply new work without hindrance from the working cutter. By employing the revolving or turret form of work holder support, and placing the same side by side at the front of the machine, by the revolution of the two turrets, the work holders are brought to the workman at his station or position at the front of the machine and he loses no time and expends no energy in moving about the machine in applying or removing work or jigs from the holders, and the machine takes up but a minimum of space.

At its center the turret has a downwardly projecting shaft or gudgeon 15 on the lower end of which is a bevel gear 16, with which meshes a bevel pinion 17 on a horizontal shaft 18 mounted in a bearing in the pedestal and having a gear 19 in mesh with and driven by a pinion 20 upon a shaft 21. On the latter is a band wheel 22 adapted to be clutched to said shaft and when so clutched adapted through the gears 19 and 20 to rotate the shaft 18 to revolve, or index the turret. Situated midway between the two pulleys 22 is a driving pulley 23 from which two belts 24 are run to the respective pulleys 22. I use a belt drive for indexing because it will slip should there be any obstacle to the turning of the turrets and thus breakage of parts avoided. On the shaft 25 of the driving pulley 24 is a gear 26 in mesh with a pinion 27 on the main driving constant speed shaft 28, which extends from front to rear of the machine, midway between the two milling machine units, and at its rear end has a band wheel 29 for connecting with a suitable source of power.

Each turret is locked against rotation except during indexing, by a vertically movable locking bolt 30, that, at its upper end, enters either of two diametrically opposite holes 31 in its underside and it is yieldingly held in locking position by a coiled spring 32. At its lower end said bolt, or an extension thereof, is pivoted to a lever 33, having a free end in the path of a finger 34 on a treadle 35 reaching to the front of the machine, by the depression of which treadle the turret is released from the locking bolt. As soon as the turret is thus released, but not before, the indexing shaft 21 is clutched to the pinion 20, this being done by the engagement by the treadle operated lever 33 with an arm 36 pivoted on the treadle shaft 37 and connected by a pitman 38 with a lever 39 that engages the clutch collar 40. A coil spring 41 extending between the treadle and the pitman 38 serves to lift the treadle when the workman's foot is removed therefrom, and to rock the lever 39 to release the clutch.

Situated between two collars or shoulders 42 on the locking bolt, is a lever 43 having its free end contiguous to a peripheral flange 44 on the turret rotating bevel gear 16, and partaking of the movement of the locking bolt in both directions. When the locking bolt is in turret-locking position, the free end of said lever, or a roller 43ª thereon, enters a slot or notch 45 in the flange 44 and as soon as the flange moves, following the withdrawal of the locking bolt, and the withdrawal of the roller from the notch, the roller 43ª bears against the underside of said flange and thereby the locking bolt is kept out of contact with the turret (which would wear a groove in the latter) but ready to enter the hole 31 therein as soon as the flange notch alines with the roller 43ª.

On the underside of each work holder is a rack 46 with which meshes a pinion 47 on a horizontal shaft 48, journaled in bearings in the turret, the two shafts 48 alining and being clutched together at their inner ends by a clutch 48ª instead of made in one piece, for convenience in assembling. Each at its outer end has a worm wheel 49, and the two worm wheels 49, in turn, are adapted to mesh with a worm 50, when by the rotation of the turret they are, respectively, brought over the latter. The rate of feed may be varied, by driving the worm 50 from the main shaft 28 through either of two shafts 51 and 52 geared thereto, one of which, at a time, may be clutched into operative engagement with the worm shaft. On the worm shaft is a pinion 53 meshing with a pinion 54 on a shaft 55 which in turn is in mesh with a gear 56 loose on the shaft 51 and having a clutch face for engagement with a clutch collar 57 on said shaft 51. Said shaft 51 is connected by spiral gears 58 with the constant speed main shaft 28 and runs the worm shaft 50 at high speed. In mesh with the gear 56 is a pinion 59 loose on the shaft 52, having a clutch face for engagement with a clutch collar 60 on the shaft 52. When the gear 56 is clutched to its shaft, the pinion 59 is loose from its shaft and vice versa, and in the last named case the gear 56 acts as an intermediate to transmit motion from the pinion 59 to the worm shaft 50. A single lever 61 engages both gears 56 and 59, and it is on a rock shaft 62 that extends to the front of the machine where it is provided with a handle 63 for rocking it to change the gear connections. The shaft 52 is geared to the constant speed shaft 28 by worm gearing 64 and change gears 65 and, hence, imparts the slow feed motion thereto. The worms 50 of both units receive their motion from the same shafts 51 and 52 which at both ends have the same gear and clutch devices above described.

The worm shaft 50 is journaled in a box 66 pivotally hung on the shaft 55 to swing the worm into and out of mesh with its wheel. It has an arm 67, which at its extremity has a stud 68 engaging a notch 69 in the side of a sliding bar 70 that is acted upon by a coil spring 71 to move it in the direction to swing the arm and box upward to mesh the worm with the worm wheel. On the side of the arm 67 is a stud 72 adapted to be engaged by a hook 73 pivoted on a shaft 74 when worm and wheel are in mesh and thereby such meshing is maintained as long as the feed of the slide or work holder is continued to the desired extent, whereupon, by the action of the slide the box is released so that the worm may drop out of mesh with the wheel. On the side of the slide is an adjustable dog 75 which by the feed of the slide is brought into contact with the upper end of a spring supported plunger 76 which is thereby depressed and acting on the upper end of a plunger 77 with which it alines at such time, moves the plunger 77 downward. The plunger 77 has rack teeth 78 meshing with pinion 79 on the shaft 74 and thereby the latter is rocked and a finger 80 on said shaft is swung into contact with a stud 81 on the latch hook 73 and the latter is disengaged from the pin 72 and the worm box is released, allowing the worm to drop from mesh with the worm wheel. As the pinion 79 also meshes with rack teeth on the sliding bar 70, simultaneously with the swinging of the finger 80, the sliding bar 70, is moved to take the pressure of its spring off the box arm 67 so as to leave the box free to rock from gravity. When the bar 70 is moved far enough for the purpose, a notch 810 in its underside is presented over a vertically movable spring pressed dog 82 and the latter is projected into the notch and thereby the bar 70 is locked until such time as the feed motion is to take place. That time is the completion of the indexing of the turret, and automatically at that time the bar 70 is released and causes the lifting of the worm box to reëngage the worm and its wheel, for the bar 70 is then moved by its spring 71 and acting on the arm 67, swings the worm box up. On the side of the treadle-actuated lever 43 is a stud 83 above a collar 84 on the latch bar 82, so that when the treadle is depressed to release the turret for indexing, the latch bar 82 will be moved out of engagement with the sliding bar 70 but while this frees the bar 70, it is restrained from acting to lift the worm box until the treadle is released on the completion of the turret-indexing operation, such restraint being due to the engagement of the lever 43 with a collar 85 on the lower end of a rod 86 which is pivotally connected at its upper end to the worm box.

The worm shaft, at one end, is provided with a handle 87 and the latch 73 is also provided with a handle 88 to permit disengagement of worm and worm wheel by hand, as a matter of convenience to the operator when setting up the job.

The means for driving the spindles 14 and for adjustment of the latter, remain to be described. On the front end of main shaft 28 (which lies midway between, and parallel with the spindles 14), is a gear 89 that meshes with a gear 90 above it, on the same shaft with a pinion 91 that meshes with a change gear 92 (see Figs. 3 and 5) on a shaft 93. On the latter is a pinion 94 with which mesh two pinions 95, each of which meshes with a pinion 96 on a shaft 97 to which is slidably splined a pinion 98 that meshes with a gear 99 on the spindle 14. As the spindles are vertically adjustable, as hereafter explained, the intermediate pinions 95 of the spindle driving trains are vertically shiftable so as at all times to remain in mesh with the gears 94 and 96 and this is accomplished by mounting each pinion 95 on a stud shaft 100 which at one end is mounted in a yoke 101 pivoted upon a sleeve 102 supported by the frame column 103, concentric with the shaft 93, and at its other end passes through a slot 104 in said column, curved concentric with said shaft 93. Nuts 105 on the stud shafts, clamp them in the positions they occupy for the desired vertical adjustment of the spindles. The column 103 is provided with slots 106 for the vertical movement of the shafts 97.

Vertical adjustment of the spindles, in each case, is effected by a hand-operated, vertical feed screw 107 swiveled to the column 103 and acting on a slide 108 in bearings in which the spindle is journaled, but it is unnecessary to describe the details concerned in this matter.

Each spindle 14 is journaled in a sleeve 109 which is mounted in the slide 108 for longitudinal adjustment, the sleeve, for this purpose, having a rack 110 in mesh with a pinion 111 on a shaft 112 having a worm wheel 113 engaged by a hand operated adjusting screw 114 swiveled on the slide 108. The rack 110 closely fits a groove in the slide 108 and thereby turning tendency of the sleeve is resisted, especially when the binding or clamping devices that are provided for the sleeve are loosened preliminary to longitudinal adjustment of the spindles.

Variations from the details of construction and arrangement shown and described may be made without departure from my invention.

What I claim is:—

1. A milling machine comprising in a unitary organization two units, each having a tool spindle and a plurality of work-holding surfaces arranged for successive action with such spindle, and arranged side by side and the work tables of both being accessible to the operator from the same point.

2. A milling machine comprising in a unitary organization two units, each having a tool spindle and a plurality of work-holding surfaces arranged for successive action with such spindle, and arranged side by side and the work tables of both being accessible to the operator from the same point, a draft shaft located between the spindles and a train of gearing for each spindle leading from said shaft.

3. A milling machine comprising in a unitary organization a plurality of units each having a tool spindle and a plurality of work-holding surfaces arranged for successive action with such spindle, a drive shaft, gearing between the drive shaft and each spindle, and means for the adjustment of one spindle relative to its work table, independently of another.

4. A milling machine comipirsing in a unitary organization two units, each having a tool spindle and a plurality of holding surfaces arranged for successive action with such spindle, and arranged side by side and the work tables of both being accessible to the operator from the same point, means for the vertical adjustment of each spindle, a central drive shaft, stationarily mounted, a train of gearing between said shaft and each spindle including a shiftable idler, and means for maintaining the gear connection between the drive shaft and the spindle at all points in the adjustment of the spindle.

5. The combination of a work holder, a drive shaft, feed mechanism geared to the drive shaft, a turret on which the work holder is mounted, power mechanism for rotating the turret geared to said drive shaft, an operator actuated device to control the connection between the drive shaft and said feed and said power mechanisms, means normally tending to operatively connect the drive shaft and said feed mechanism, and means connected with said operator-actuated device by which said normal tendency may be restrained.

6. The combination of a work holder, a drive shaft, feed mechanism geared to said shaft, including an element automatically shiftable to make and break the connection with said shaft, a turret on which the work holder is mounted, gearing between said turret and said drive shaft, an operator controlled device, for making and breaking said gear connection, and a connection between said device and said automatically shiftable element that enables said device to control the automatic shifting of said element.

7. A milling machine comprising in a unitary organization a plurality of units each having a tool spindle and a plurality of holding surfaces arranged for successive action with such spindle, a turret for the work holding surfaces of each unit, and power mechanism for rotating the turret comprising drive and driven shafts and a friction driving connection between said shafts.

In testimony that I claim the foregoing I have hereunto set my hand.

JAMES C. POTTER.

Copies of this patent may be obtained for five cents each, by addressing the "Commissioner of Patents, Washington, D. C."